I. DE KAISER.
INDUCTION MOTOR.
APPLICATION FILED JULY 6, 1908.
990,964.
Patented May 2, 1911.
2 SHEETS—SHEET 1.
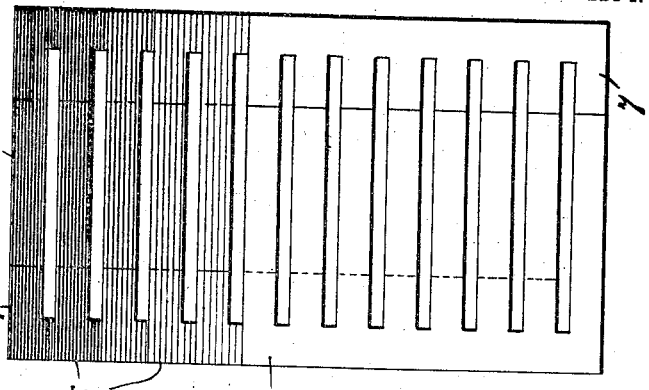
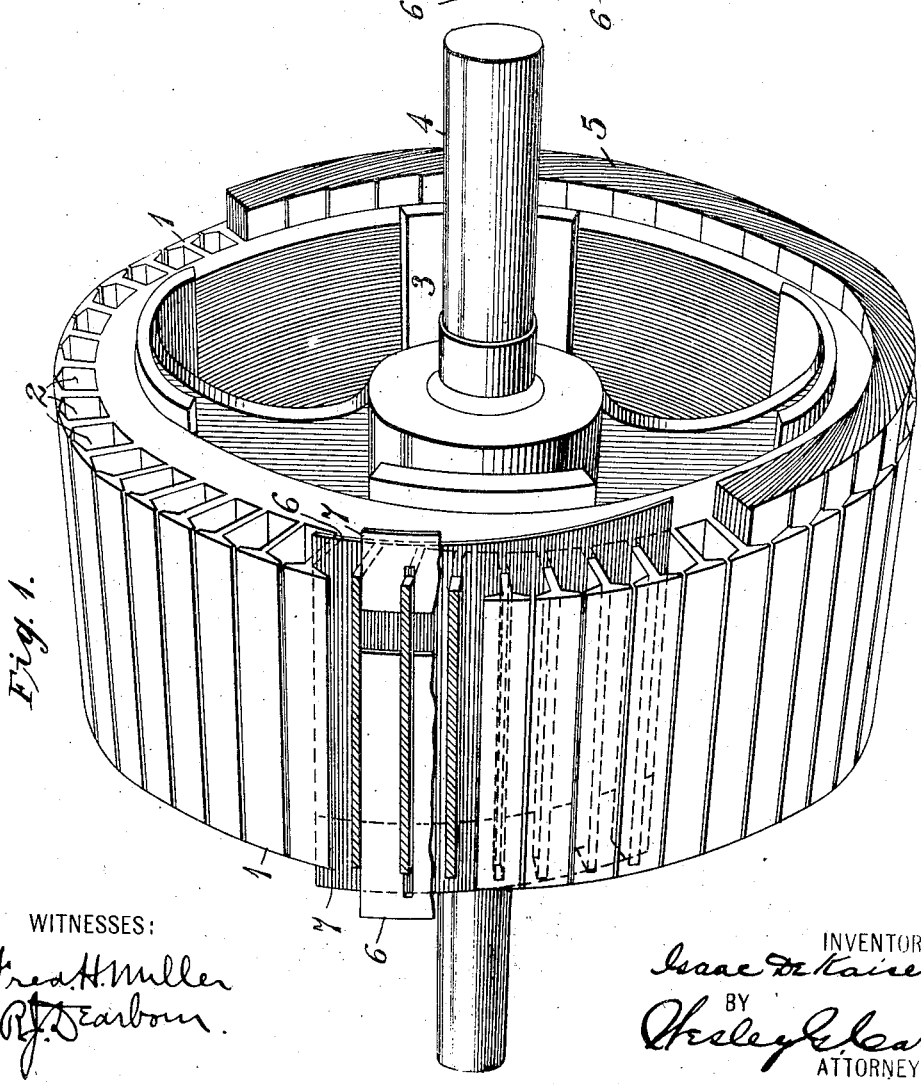

I. DE KAISER.
INDUCTION MOTOR.
APPLICATION FILED JULY 6, 1908.
990,964.
Patented May 2, 1911.
2 SHEETS—SHEET 2.
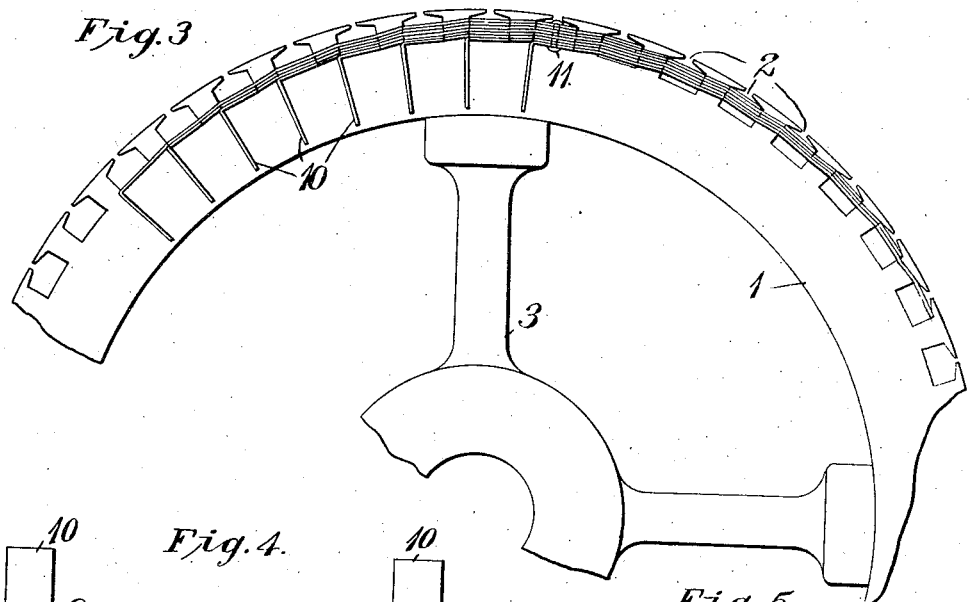
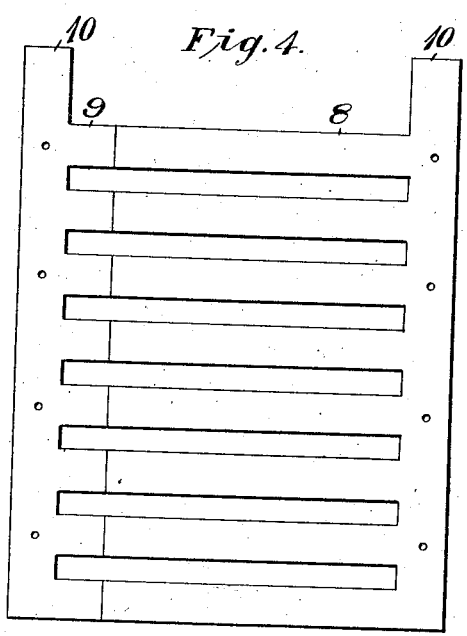
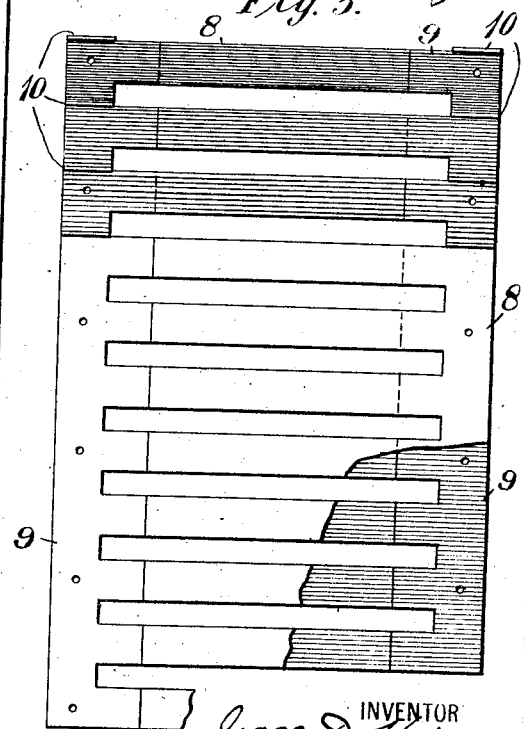
WITNESSES:
INVENTOR
Isaac De Kaiser
BY
Wesley G. Carr
ATTORNEY

UNITED STATES PATENT OFFICE.

ISAAC DE KAISER, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

INDUCTION-MOTOR.

990,964.  Specification of Letters Patent.  Patented May 2, 1911.

Application filed July 6, 1908. Serial No. 442,170.

*To all whom it may concern:*

Be it known that I, ISAAC DE KAISER, a citizen of the United States, and a resident of Wilkinsburg, in the county of Allegheny and State of Pennsylvania, have invented a new and useful Improvement in Induction-Motors, of which the following is a specification.

My invention relates to induction motors and particularly to the secondary members or rotors of such machines.

The object of my invention is to provide a secondary or rotor winding for induction motors, which may be readily and cheaply formed and applied and which shall be effective and durable in service.

In the manufacture of rotors or secondary members of induction motors, it is usual to insert copper rods or bars in the core slots and to fasten to the projecting ends of such rods or bars, rings of either the same material or of material having greater specific resistance, the parts being fastened together by means of bolts and solder or other suitable fastening means. The usual method of attaching the end rings to the conductor rods or bars involves a considerable amount of labor and is relatively expensive, and there is always a tendency for the fastening devices to become loosened, particularly in motors operating at high speeds.

In view of the labor and expense of manufacturing such motors as those just described and the danger of disarrangement of parts in operation, I have devised the winding shown in the accompanying drawings, in which—

Figure 1 is a perspective view of the core of a rotor, having a portion of its windings in position thereon, certain other portions being broken away. Fig. 2 is a plan view of a portion of the winding shown in Fig. 1. Fig. 3 is an end elevation of a portion of a rotor having parts of its winding in position thereon, the winding being a modification of that shown in the preceding figures. Fig. 4 is a plan view of two abutting segments of the winding shown in Fig. 3, and Fig. 5 is a plan view of a plurality of segments, showing their relative positions when applied to the core.

Referring first to Figs. 1 and 2, the laminated core 1, which is provided with partially closed slots 2, in accordance with the usual practice, is mounted and clamped in position on a spider 3, having a shaft 4. The core 1, spider 3, and shaft 4 may be of any desired construction suitable for the service to be performed, my improvement having to do solely with the winding which is applied to the core. The winding 5 comprises a large number of toothed plates 6 and 7 of copper, or other suitable conducting material, these plates being assembled in the manner indicated in Fig. 1. Inasmuch as the core slots are radial and it is desired to use winding plates of uniform dimensions, these plates are so disposed in the slots as to provide a spiral winding; that is, each plate which may span the space covered by any desired number of slots, is so disposed that one end tooth is located in the bottom of the corresponding slot and the other end tooth is located in the top or outer end of its slot, the plates being suitably bent or curved to occupy intermediate positions in the intervening slots. In order to permit of the insertion of the toothed plates into the partially closed slots and also to break joints in such manner as to provide a compact and substantially continuous structure, I provide one set of plates 6 having relatively long teeth, which project considerably more than one-half the distance through the slots and a complementary set of plates 7 having relatively short teeth which are inserted at the other end of the core and abut against the corresponding inner ends of the teeth of the plates 6. The long and short toothed plates are alternated with each other, from the bottom sides to the top sides of the slots, so as to break joints, as is clearly indicated in the drawings. In order to facilitate the making of a compact structure, it will generally be found advisable to tin the plates before inserting them into the slots, and, after the structure is completely built up, it may be subjected to sufficient heat to solder the abutting ends of the plates together, or the entire structure may be subjected to a bath of molten solder in order to unite the abutting ends. The projecting ends of the plates which, when combined, constitute the end rings, may be of any desired dimensions; and, if of greater conductivity than desired, they may be readily turned down to such dimensions as will provide the desired amount of resistance.

In the modification shown in Figs. 3, 4, and 5, the toothed plates 8 and 9 are formed and applied to the core in the manner which has already been described, except that, in this instance, I have provided each plate with a projection 10 at one end, which may be bent at substantially right-angles to the body of the plate to form a fan or fan blade to serve in promoting ventilation in the structure, when in operation.

In either form of winding, the projecting portions of the plates constituting the end rings may be fastened together, by any suitable means, in order to insure rigidity and also to provide a greater degree of conductivity, the means shown in Figs. 3, 4, and 5 being rivets 11 which are, or may be, applied in the usual manner, after the winding has been completely placed in position.

It will be observed that the structure shown and described provides a laminated winding, the joints of which lie within the slots and are so arranged as to be staggered with respect to each other in the various layers; and that the number of segments which may be employed permits of using thin material, thus facilitating the application of the winding, on account of the flexibility of the material and improving the contact between adjacent plates. If the segments are tinned or soldered, as above suggested, they may constitute a substantially solid mass of conducting material. The structure is such as to involve a relatively small waste of material, and the arrangement is such that, with an increase of temperature, the intimacy of contact between the several parts will be increased by expansion, thus increasing the degree of conductivity. Little or no harmful effects can ensue from endwise expansion, for the reason that the winding is made up of layers and an endwise movement of the layers can in no wise vary the amount and degree of contact between them.

Variations in form, dimensions and relative arrangement of parts which do not materially affect the mode of operation or result are intended to be included within the scope of my invention.

I claim as my invention:

1. The combination with a slotted core, of a plurality of overlapping plates having teeth located in the core slots and in electrical contact with each other.

2. The combination with a slotted core, of a plurality of overlapping plates having teeth located in the core slots and in electrical contact with each other, the end teeth of each plate being respectively disposed at the top and the bottom of their respective slots.

3. The combination with a slotted core, of a set of plates having teeth which project into the core slots from one end and a second set of plates having teeth which project into the slots from the other end.

4. The combination with a slotted core, of two sets of plates having teeth of different lengths, which are inserted into the core slots from opposite ends to abut against each other.

5. The combination with a slotted core, of two sets of superposed plates having teeth of different lengths, which are inserted into the core slots from opposite ends, the plates having the long teeth being alternated with those having the short teeth in the successive layers.

6. The combination with a slotted core, of a winding comprising two sets of overlapping plates having teeth which project into the core slots and abut against each other.

7. The combination with a slotted core, of a winding comprising two sets of overlapping plates having teeth which project into the core slots and abut against each other, the successive plates of each set having long teeth and short teeth alternately.

8. The combination with a slotted core, of a winding comprising two sets of spirally superposed plates having teeth located in the core slots, the inner ends of which abut against each other.

9. The combination with a slotted core, of a winding comprising two sets of superposed plates having teeth the inner ends of which are soldered together in the core slots.

10. The combination with a slotted core, of a winding comprising two sets of superposed toothed plates, the teeth of the successive plates of each set being alternately long and short.

11. The combination with a slotted core, of a winding comprising two sets of superposed plates having their outer ends fastened together and having teeth located in the core slots.

12. A winding for an electrical machine member comprising two sets of electrically connected superposed toothed plates.

13. A winding for an electrical machine member comprising two sets of superposed toothed plates having abutting inner ends.

14. The combination with a slotted core, of a winding comprising two sets of superposed toothed plates having radially disposed end projections to serve as ventilating fans.

15. The combination with a slotted core, of a winding comprising two sets of superposed toothed plates which are successively disposed circumferentially and fastened together.

16. The combination with a slotted core, of a winding comprising two sets of spirally superposed toothed plates fastened together and having abutting inner ends.

In testimony whereof, I have hereunto subscribed my name this 27th day of June, 1908.

ISAAC DE KAISER.

Witnesses:
 WM. H. SIEMON,
 BIRNEY HINES.